Dec. 29, 1931.  J. M. CRAWFORD  1,838,906
BRAKE CROSS SHAFT BRACKET
Filed March 29, 1930
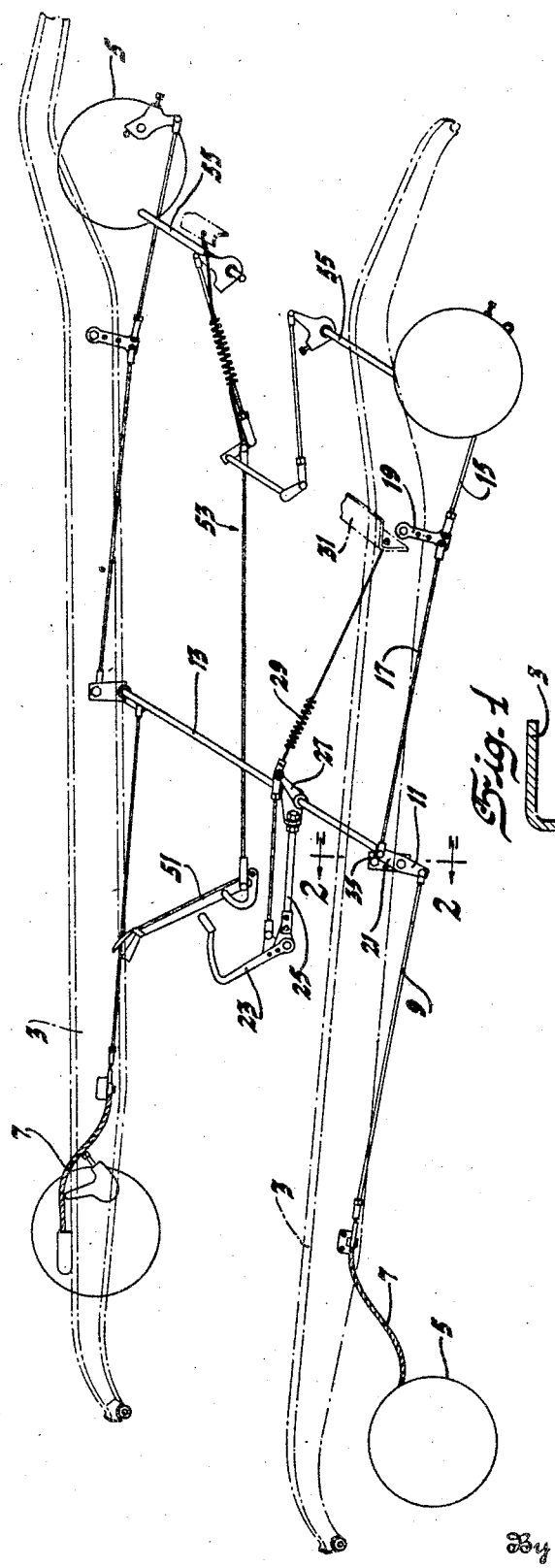
Inventor
James M. Crawford
By Blakemore, Spencer & Hill
Attorneys Patented Dec. 29, 1931

1,838,906

UNITED STATES PATENT OFFICE

JAMES M. CRAWFORD, OF DETROIT, MICHIGAN, ASSIGNOR TO GENERAL MOTORS CORPORATION, OF DETROIT, MICHIGAN, A CORPORATION OF DELAWARE

BRAKE CROSS SHAFT BRACKET

Application filed March 29, 1930. Serial No. 440,001.

This invention relates to brakes. More specifically it has been designed to improve the hook-up between brakes operable upon the front and rear wheels of vehicles.

An object of the invention is to provide means to mount the cross shaft of a brake hook-up for limited movement to thereby provide an equalized brake action. Another object is to provide means associated with the cross shaft to locate the same in a predetermined position. The invention also provides means to restore the cross shaft to its initial position after being moved forward in the act of applying the brake. As a further object the assembly provides means for preventing squeaks or rattles.

The invention will be understood from the following description associated with the accompanying drawings.

In the drawings—

Fig. 1 is a perspective of a vehicle chassis having my novel hook-up associated therewith.

Fig. 2 is a section on line 2—2 of Fig. 1.

Referring by reference characters to the drawings, numeral 3 represents the frame bars of a vehicle equipped with brakes both front and rear. Numeral 5 represents the brake drums. From the front brakes flexible operating cables 7 extend to a convenient point on the frame at which point connection is made by rods 9 to arms 11 extending downwardly from the ends of a rock shaft 13. From the rear brake rods 15 and 17 extend forwardly. At each side of the vehicle these rods are joined at their adjacent ends to a swinging link 19. Rods 17 are connected to upper arms 21 on shaft 13. This shaft 13 is rotatable under the action of a pedal 23, a connecting rod 25 and a lever arm 27. A spring 29 connected to the lever arm 27 and to a convenient point on the frame serves to restore the rock shaft 13 and the pedal to initial position after brake application. Rock shaft 13 at each end is terminally mounted for rotation in a member 33 having a spherical surface surrounded by an interior spherical surface within a bracket 35 preferably made from mating stampings as best shown in Fig. 2, the parts of the bracket being secured together by suitable fastening means 37. Carried by each frame member is a pivot bolt 39, a bushing 41 held around the bolt between its head and the frame by the securing nut 43. Within an eye 45 of the bracket and surrounding the bushing 41 is a rubber ring 47. This rubber ring is under compression between the bushing and the eye of the bracket. The spherical surfaces of member 33 and the bracket serve to prevent the weaving motions of the frame being transmitted to the shaft 13.

The drawings also show an emergency lever 51 which is connected by a suitable hook-up 53 with rock shafts 55 associated with each rear brake drum. It may be said that this emergency brake system is distinct from and not related to the subject matter of this invention and need be no further described.

The type of support for rock shaft 13 obviously provides for any inaccuracy of brake adjustment. It provides convenient means for mounting the brackets in a predetermined angular position relative to the frame. The torsion of the compressed rubber ring serves to return the cross shaft to its normal position after brake application, whenever the rock shaft may have been moved from that position in the act of applying the brakes as a result of any inaccuracy of adjustment. The rubber rings also serve to prevent annoying squeaks or rattles.

I claim:

1. In a four-wheel brake hook-up, a continuous cross shaft, brackets supporting said cross shaft, pivot means for swingingly supporting said brackets, means associated with said pivot means to resiliently resist swinging of said brackets from a predetermined normal position.

2. The invention defined by claim 1, said last named means comprising a rubber member operable additionally to prevent transmission of noise.

3. In a brake hook-up for vehicles, frame members, aligned pivot bolts carried thereby, brackets having eyes surrounding said pivot bolts, deformable cushioning means within said eyes and surrounding said pivot bolts, a rock shaft for applying brakes rotatably supported in said brackets.

4. The invention defined by claim 3, said deformable cushioning means being under compression to torsionally resist swinging of said brackets.

5. The invention defined by claim 3 together with spherically surfaced bearings carried by said shaft, and said brackets having similarly shaped sockets to support said bearings.

In testimony whereof I affix my signature.

JAMES M. CRAWFORD.